(12) United States Patent
Hancock et al.

(10) Patent No.: US 9,068,559 B2
(45) Date of Patent: Jun. 30, 2015

(54) ROTOR BLADE FOR A WIND TURBINE AND A METHOD FOR MAKING THE SAME

(75) Inventors: Mark Hancock, Southampton (GB); Andrew Hedges, Southampton (GB); Rens Christiaan Verhoef, Ringkobing (DK); Anton Bech, Ringkobing (DK); Tomas Vronsky, Woolston (GB)

(73) Assignee: Vestas Wind Systems A/S, Aarhus N. (DK)

( * ) Notice: Subject to any disclaimer, the term of this patent is extended or adjusted under 35 U.S.C. 154(b) by 948 days.

(21) Appl. No.: 13/201,341

(22) PCT Filed: Feb. 15, 2010

(86) PCT No.: PCT/EP2010/051842
§ 371 (c)(1),
(2), (4) Date: Oct. 14, 2011

(87) PCT Pub. No.: WO2010/092168
PCT Pub. Date: Aug. 19, 2010

(65) Prior Publication Data
US 2012/0045343 A1    Feb. 23, 2012

Related U.S. Application Data

(60) Provisional application No. 61/153,083, filed on Feb. 17, 2009.

(30) Foreign Application Priority Data

Feb. 16, 2009   (DK) ................................ 2009 00216

(51) Int. Cl.
*F03D 1/06* (2006.01)
*B29C 70/30* (2006.01)
(Continued)

(52) U.S. Cl.
CPC ......... *F03D 1/0675* (2013.01); *Y10T 29/49336* (2015.01); *B29C 70/30* (2013.01);
(Continued)

(58) Field of Classification Search
CPC ............ F03D 1/0675; F05B 2240/302; F05B 2240/30; Y02E 10/721
USPC .............. 416/226, 233, 210 R, 209, 238, 239
See application file for complete search history.

(56) References Cited

U.S. PATENT DOCUMENTS 4,264,278 A * 4/1981 Weingart ...................... 416/226
4,278,401 A   7/1981 Martinelli
(Continued)

FOREIGN PATENT DOCUMENTS

| ES | 2 310 489 | 1/2009 |
|---|---|---|
| GB | 909 004 | 10/1962 |

(Continued)

OTHER PUBLICATIONS

Jens Skou; 1st Technical Examination and Search Report issued in priority Denmark Application No. PA 2009 00216; Oct. 2, 2009; 4 pages; Denmark Patent and Trademark Office.
(Continued)

*Primary Examiner* — Dwayne J White
*Assistant Examiner* — Adam W Brown
(74) *Attorney, Agent, or Firm* — Wood, Herron & Evans, LLP

(57) ABSTRACT

The invention relates to a rotor blade for a wind turbine. The rotor blade comprises a shell and a spar forming a longitudinally extending hollow structure within the shell and comprising: a leading web, a trailing web, and one or more additional webs. Each additional web defines an intermediate portion between a hub end and a tip end. The intermediate portion of each additional web is spaced apart from the leading and trailing webs and at least one of the tip and the hub ends is connected to or integral with the leading or the trailing web. The invention further relates to a wind turbine comprising the rotor blade, and a method for manufacturing the rotor blade.

14 Claims, 5 Drawing Sheets

(51) Int. Cl.
*B29C 70/86* (2006.01)
*B29D 99/00* (2010.01)
*B29L 31/08* (2006.01)

(52) U.S. Cl.
CPC ......... *B29C 70/865* (2013.01); *B29D 99/0028* (2013.01); *B29L 2031/085* (2013.01); *F05B 2230/23* (2013.01); *F05B 2230/50* (2013.01); *F05B 2260/30* (2013.01); *F05B 2280/6003* (2013.01); *F05B 2280/6012* (2013.01); *F05C 2253/04* (2013.01); *F05C 2253/14* (2013.01); *Y02E 10/721* (2013.01)

(56) References Cited

U.S. PATENT DOCUMENTS

| | | | | |
|---|---|---|---|---|
| 4,976,587 A | * | 12/1990 | Johnston et al. | 416/230 |
| 5,439,353 A | * | 8/1995 | Cook et al. | 416/230 |
| 2008/0075603 A1 | | 3/2008 | Van Breugel et al. | |
| 2008/0310964 A1 | | 12/2008 | Llorente Gonzalez et al. | |

FOREIGN PATENT DOCUMENTS

| | | |
|---|---|---|
| GB | 909004 A * | 10/1962 |
| GB | 2 362 865 | 12/2001 |
| JP | 2007-255366 | 10/2007 |

OTHER PUBLICATIONS

Laurent Libeaut; International Search Report and Written Opinion issued in priority International Application No. PCT/EP2010/051842; Mar. 31, 2011; 10 pages; European Patent Office.

Yolaine Cussac; International Preliminary Report on Patentability issued in priority International Application No. PCT/EP2010/051842; Aug. 16, 2011; 6 pages; The International Bureau of WIPO.

\* cited by examiner

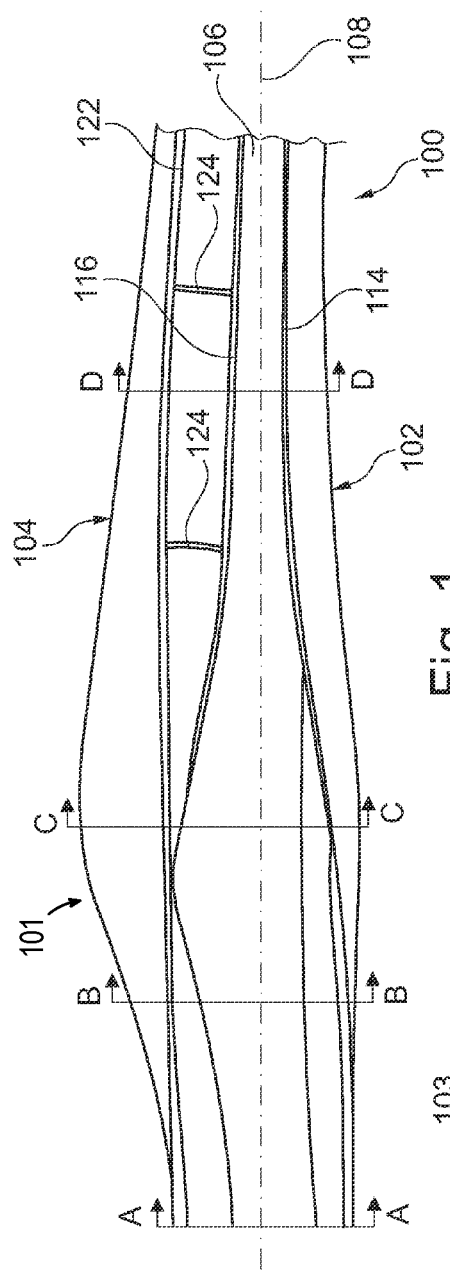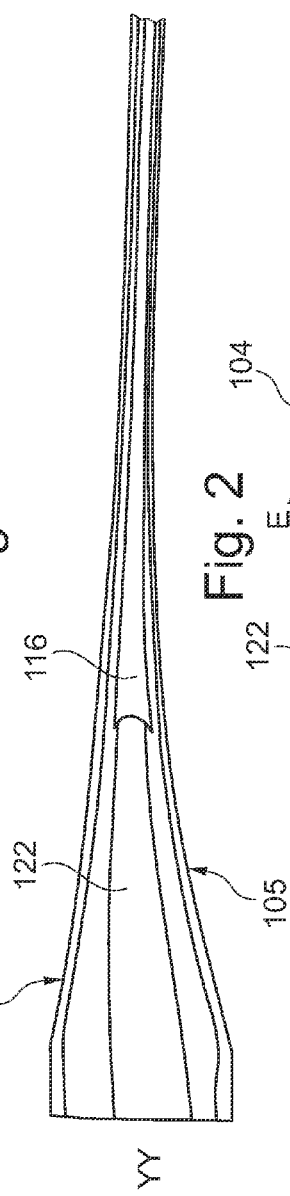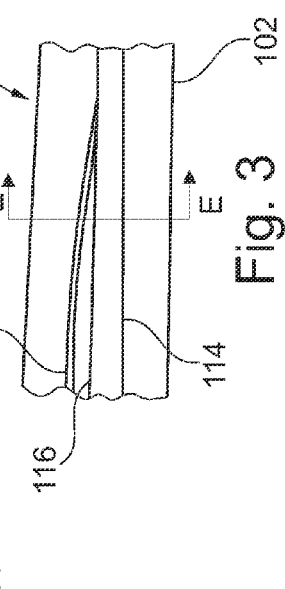

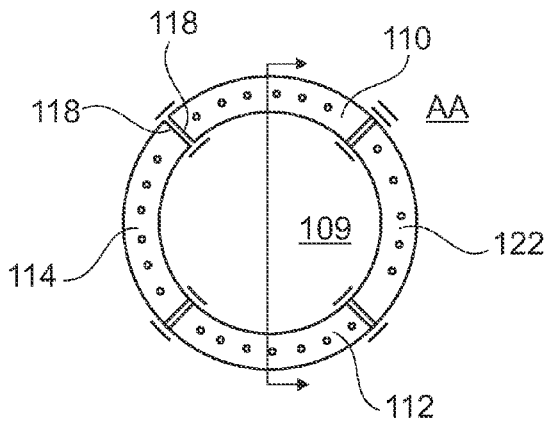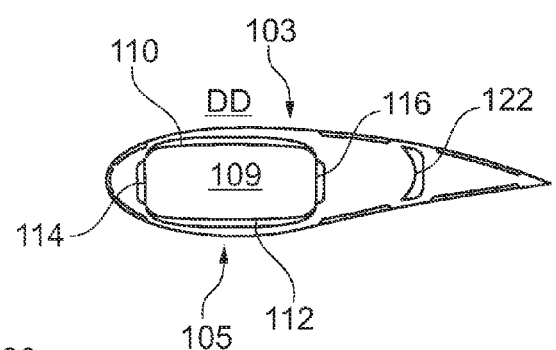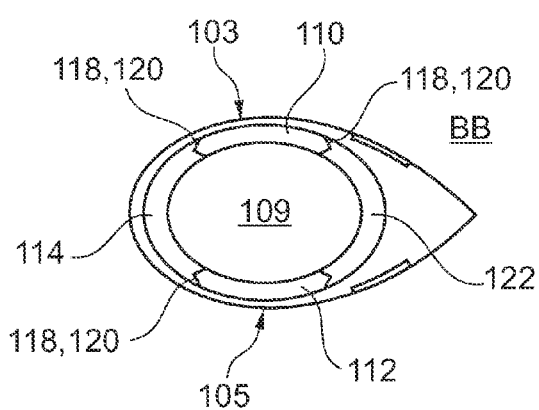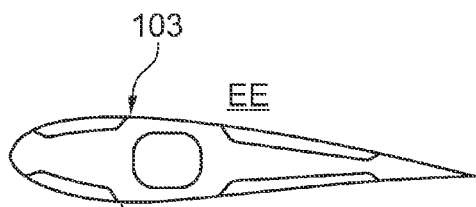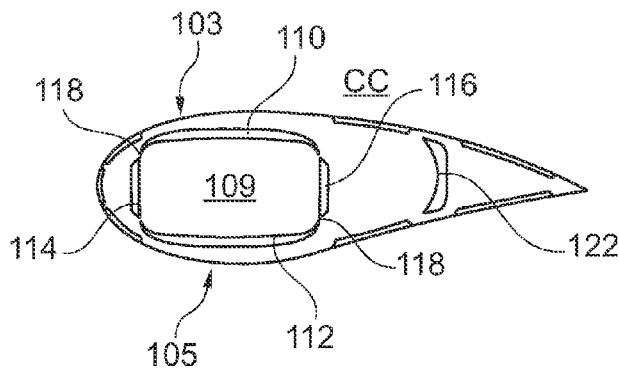

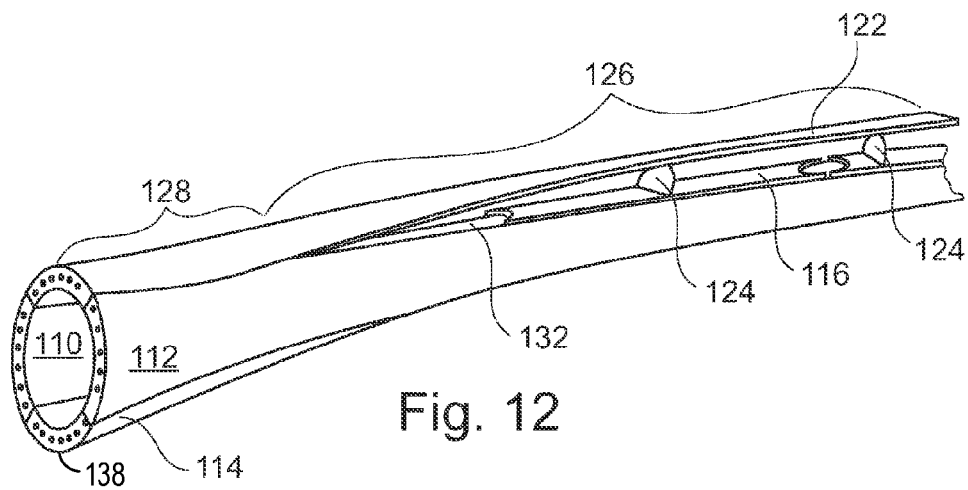
Fig. 12
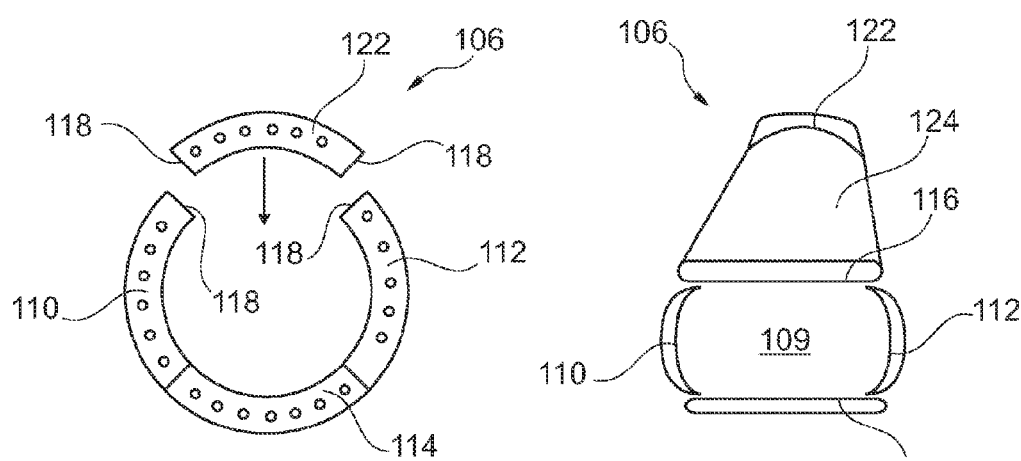
Fig. 13
Fig. 14
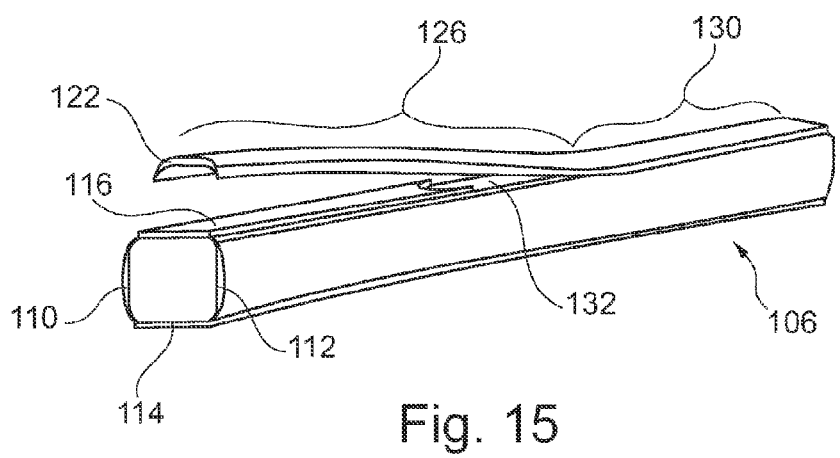
Fig. 15

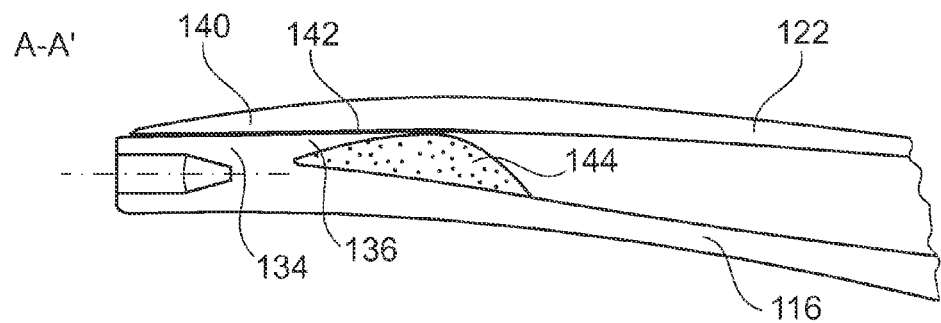
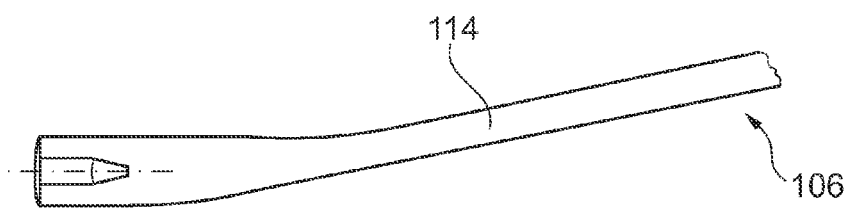
Fig. 16
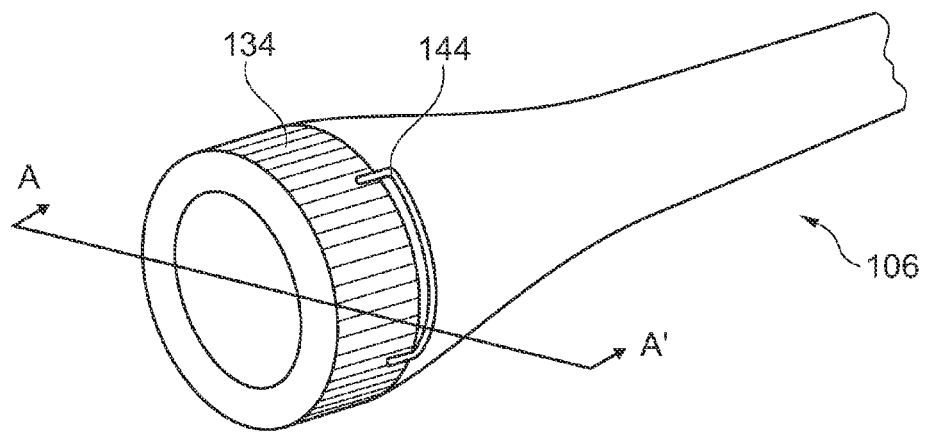
Fig. 17

ROTOR BLADE FOR A WIND TURBINE AND A METHOD FOR MAKING THE SAME

FIELD OF THE INVENTION

The present invention relates to a rotor blade for a wind turbine comprising a spar with two webs defining a longitudinally extending hollow structure. Moreover, the present invention relates to a wind turbine comprising a rotor blade and to a method of manufacturing the rotor blade.

BACKGROUND OF THE INVENTION

Typically, a rotor blade for wind turbines comprises a spar for transferring the load from the rotor blade to the hub. Different kinds of forces act on the blade in use. A first is the centrifugal force acting on the blade in a longitudinal direction of the blade. This force is caused by the rotation of the blade about the hub. A second kind is forces acting on the rotor blade in a thickness direction i.e. a direction extending through the leeward and the windward side of the rotor blade. These forces are caused by the wind acting on the blade. A third kind is forces acting on the rotor blade in a chord direction i.e. a direction extending through the leading edge and the trailing edge of the rotor blade. These forces are caused by gravity, when the blade extends in the horizontal direction or in any other direction transverse to the vertical direction.

As the size of wind turbines increases, the rotor blades have increasing length, thickness and width. The centre of elasticity of the blade is highly dependent on the position of the spar inside the blade. Thus with increased width of the blade, the distance from the trailing edge and/or the leading edge to centre of elasticity is increased. This causes the blade to be more vulnerable to the third kind of abovementioned forces, i.e. forces in the chord direction, as the edgewise stiffness decreases.

It is an object of embodiments of the present invention to provide a rotor blade which has an improved ability of transferring load in the direction of the chord.

DESCRIPTION OF THE INVENTION

In a FIRST aspect, the present invention relates to rotor blade for a wind turbine, the rotor blade comprising a shell and a spar, the shell forming a windward and a leeward side and the spar forming a longitudinally extending hollow structure within the shell, the spar comprising:
   a leading web,
   a trailing web, and
   one or more additional webs,
   wherein each web extends between the windward and leeward sides of the shell,
   wherein each additional web defines an intermediate portion between a hub end and a tip end, and
   wherein the intermediate portion of each additional web is spaced apart from the leading and trailing webs and at least one of the tip and the hub ends is connected to or integral with the leading or the trailing web.

One advantage of the present invention is that the stiffness of the blade in the chord direction may be increased by the provision of one or more additional webs. Moreover, the provision of one or more additional webs allows for a design in which the centre of elasticity of the rotor blade may be moved towards the leading or the trailing edge at the choice of the designer.

In general it will be appreciated that the additional web carries longitudinal stiffness over most of the blade In the context of the present invention, the term leading edge shall be understood as the edge that, during operation, hits the air first. Similarly, the term trailing edge shall designate the rearmost part of the rotor blade.

In the context of the present invention, the term "chord" shall designate the distance from the leading edge to the trailing edge of the rotor blade at any given position along the length of the rotor blade.

Further in the context of the present invention, the term "thickness" shall designate the distance between the windward and the leeward side of the rotor blade.

Moreover in the context of this invention, the 'proximal end' of the rotor blade shall designate the hub end, and the 'distal end' of the rotor blade shall designate the tip.

Additionally in the context of the present invention, the term "length" of the rotor blade shall designate the direction from the hub to the tip. Dimensions in this direction may in this invention be said to be shorter or longer. Unless otherwise stated the longitudinal direction shall be a direction extending in the direction of the length or substantially in said direction.

Furthermore, the term "width" shall designate the direction from the leading edge to the trailing edge, i.e. the direction of chord of the rotor blade. Dimensions in this direction may in this invention be said to be wider or narrower.

Additionally, the term "thickness" of the rotor blade shall designate the direction extending between the windward to the leeward side of the rotor blade, i.e. a direction transverse to the chord. Dimensions in this direction may in this invention be said to be thicker or thinner.

The spar forms a longitudinally extending hollow structure which may extend from the hub in the direction of the tip. The spar is used to transfer load from the rotor blade to the hub of the rotor blade. Such loads can be tensile and compression forces or torque.

The longitudinally extending hollow structure defined by the spar may have a cross-section in a direction transverse to the longitudinal direction which defines any shape such as a rectangular polygon, a square, an oval shape, an elliptic shape, a super-elliptic shape or a circular shape cross-section.

Moreover, the spar comprises one or more additional webs each of which defines a hub end, a tip end and an intermediate portion between the extremities. It will be appreciated that the latter is positioned between the tip end and the hub end. The spar may comprise any number of additional webs, such as one, two, three, four, five etc. In one embodiment, one or more—such as all—of the additional webs is/are positioned between the leading web and the leading edge of the rotor blade. In another embodiment, one or more—such as all—of the additional webs is/are positioned between the trailing web and the trailing edge of the rotor blade.

The spar i.e. the one or more of the webs and/or one or more of the caps, may comprise a fibre material such as carbon fibres, glass fibres or basalt fibres. In one embodiment the additional web comprises one or more of such fibers.

Each of the additional webs is arranged such that the intermediate portion is spaced apart from the leading and trailing webs while the tip and/or the hub end(s) is/are directly connected to or integral with the leading or the trailing web. In one embodiment of an additional web, the hub end is directly connected to or integral with the leading or trailing web, while both the intermediate portion and the tip end are spaced apart from the leading or trailing web. In another embodiment, the hub end and the intermediate portion are spaced apart from the leading or trailing web, while the tip end is directly connected to or integral with the leading or trailing web.

In the context of the present invention, the term "directly connected to" shall be understood such that one surface of the additional web abuts a surface of the leading or trailing web. In some embodiments, said abutment surfaces are utilised to adhere the additional web to the leading or trailing web.

In one embodiment, the shell forms a leading edge and a trailing edge and the rotor blade defines a trailing additional web arranged between the trailing edge and the spar. Moreover in said embodiment, the trailing additional web may form at least a part of the shell in the area of the trailing edge. In one embodiment, the trailing additional web defines a separate element which defines the trailing edge of the shell i.e. both the leeward and the windward side of the trailing edge. In the latter embodiment, the entire shell is defined by the two shell halves and the separate element. By designing the trailing additional web such that it defines a part of the trailing edge, a simpler structure may be provided for.

10 percent of the length of the trailing edge may be defined by the trailing additional web, such as 20 percent, such as 25 percent, such as 30 percent, such as 33 percent, such as 40 percent, such as 50 percent, such as 60 percent, such as 66 percent, such as 70 percent, such as 75 percent.

Alternatively, or as a supplement, a leading additional web may be arranged between the leading edge and the leading web. Moreover, the leading additional web may form at least a part of the shell in the area of the trailing edge. In one embodiment, the leading additional web defines a separate element which defines the leading edge of the shell i.e. both the leeward and the windward side of the leading edge. In the latter embodiment, the entire shell may be defined by the two shell halves and the separate element.

10 percent of the length of the leading edge may be defined by the leading additional web, such as 20 percent, such as 25 percent, such as 30 percent, such as 33 percent, such as 40 percent, such as 50 percent, such as 60 percent, such as 66 percent, such as 70 percent, such as 75 percent.

Furthermore one or more interconnecting elements may be provided. The interconnecting elements may be arranged to abut one of the additional webs and one of the leading and trailing webs so as to space apart the intermediate portion of said additional web from the leading and trailing webs.

The interconnecting elements may be useful during manufacture to space the additional web apart from the leading and trailing web and to retain the additional web in this position until the additional web is fastened to other parts of the rotor blade such as its shell. The interconnecting elements may be used to transfer load from the additional web to the leading/trailing web in the area of the intermediate portion of the additional web.

In one embodiment, the leading web and the trailing web are interconnected by at least one cap which extends in the width/chord direction of the blade. In one embodiment, one cap is provided and interconnects the leading and trailing web so as to define an H-shaped cross-section. In one embodiment, a leeward cap and a windward cap are provided which are interconnected at their longitudinal edges by means of the leading and the trailing webs whereby the longitudinally extending hollow structure is defined.

In the latter embodiment, each of the longitudinally extending edges of the webs is connected/fastened to a longitudinally extending edge of one of the two caps. Similarly in said embodiment, each of the longitudinally extending edges of the caps is connected/fastened to the longitudinally extending edge of one of the two webs.

The leeward cap and/or the windward cap may define a part of the aerodynamic profile of the rotor blade. Similarly, one or more of the additional webs may define a part of the leading or the trailing surface of the rotor blade as is described above. By designing the spar and/or the additional web such that it/they define a part of the aerodynamic profile of the rotor blade, a simpler and often lighter design may be achieved.

In order to transfer load from the additional web to the leading or trailing web, the additional web may be integral with or directly connected to the leading/trailing web. In one embodiment, the additional web is integral with the leading or trailing web such that a V-shaped element defines both an additional web and trailing/leading web.

In one embodiment, the longitudinally extending hollow structure defines a mounting structure with an adhering surface to which one or more additional webs is adhered so as to allow tensile forces to be transferred from the additional web to the mounting structure. The mounting structure and the additional web may be shaped such that the tensile forces are gradually transferred from the additional web to the mounting structure when seen from the intermediate portion of the additional web and towards its hub end thereof.

In one particular embodiment, the mounting structure defines a tapered protrusion extending from an outer surface of the spar i.e. at an angle between 0 and 90 degrees with respect to the longitudinal direction of the rotor blade. Moreover, in said embodiment the additional spar may have a tapered end, which may be adhered to the tapered protrusion such that a joint cross-sectional area of the additional spar and the mounting structure—in the area of overlap—is constant or changes gradually in the area of overlap when seen from the intermediate portion of the additional web and towards its hub end thereof. The advantage is that dramatic changes in the stress along the length of the additional web may be avoided.

In one embodiment, the tapered end of the spar and the tapered protrusion of the mounting structure are designed such that as much of the force transferred from the additional web to the mounting structure is transferred as shear forces i.e. such that the normal/tensile forces are minimised. The advantage is that a bonding by adhesion is normally capable of transferring a larger amount of shear forces than normal forces.

It will be appreciated that the closer the surfaces for adhering is to being parallel with the longitudinal direction of the additional web, the larger is the percentage of the shear stress in the area of the joint compared the normal stress. It will also be appreciated that the larger the area of the two tapered surfaces are, the lower the shear stress generally is.

In a SECOND aspect, the present invention relates to a wind turbine comprising a plurality of rotor blades according to the first aspect of the invention. It will be appreciated that the invention according to the second aspect may comprise any combination of features and elements of the invention according to the first aspect.

In a THIRD aspect, the present invention relates to a method for manufacturing a spar adapted to form a longitudinally extending hollow structure with a hub portion and a tip portion within a shell of a rotor blade for a wind turbine, the spar defining a tapered mounting structure extending from an outer surface of the spar and defining an adhering surface to which an additional web may be adhered so as to allow tensile forces to be transferred from the additional web to the mounting structure, the method comprising the steps of:

winding a sheet of reinforcing material around a mandrel so as to form the spar,
  providing a space-defining element in the area of the hub portion of the spar, and winding the sheet of reinforcing material around the space-defining element, so as to form the tapered mounting structure at least a part of which is spaced apart from the outer surface of the spar.

In one embodiment, at least a part of the space-defining element is wedge shaped, and provided on the spar such that the thickness of the wedge decreases in the direction of the hub portion of the spar. In another embodiment, at least a part of the space-defining element comprises a foamed material. It will be appreciated that by providing a foamed material the space-defining element may be light relative to its volume, whereby the element provides an insignificant contribution to the total weight of the spar and, thus, the blade.

It will be appreciated that by providing the shape-defining element, the tapered mounting structure may easily be defined as a part of the process of forming the spar. Moreover it will be appreciated that by manufacturing the shape-defining element by means of the sheet of reinforcing material, a strong and light structure may be provided for.

The invention according to the third aspect may comprise any combination of features and/or elements of the invention according to the first aspect.

DESCRIPTION OF THE DRAWINGS

Examples of the invention will now be described with reference to the drawings in which FIGS. 1 and 3 disclose a cross-section of the rotor blade in a plane extending through the chord and the length of the rotor blade, FIG. 2 discloses a cross-section of the rotor blade in a plane extending through the thickness and the length of the rotor blade, FIGS. 4-8 disclose cross-sections of the rotor blade in a plane defining a right angle with the length of the rotor blade, FIG. 9 discloses an isometric view of a spar according to the present invention, FIGS. 10 and 11 disclose cross-sections of the spar, without the trailing additional web, FIGS. 12 and 15 each discloses an isometric view of a completed spar, i.e. with the trailing additional web, FIGS. 13 and 14 disclose cross-sections of the spar of FIGS. 12 and 15, FIG. 16 discloses the cross-section of FIG. 17, i.e. a spar with a mounting structure for fastening the trailing additional web to the spar, and FIG. 17 discloses the provision of a foam to define the tapered protrusion of the mounting structure.

FIG. 1 discloses a rotor blade 100 for a wind turbine (not shown) with a shell 101 defining a leading edge 102, a trailing edge 104, a leeward side 103 and a windward side 105. The rotor blade 100 comprises a spar 106 which extends in a longitudinal direction 108 of the rotor blade 100. The spar 106 forms a hollow structure with a longitudinally extending cavity 109 as may be seen in FIGS. 4-8. The hollow structure is defined by a leeward cap 110, a windward cap 112, a leading web 114 and a trailing web 116. Each of the caps 110,112 and the webs 114,116 define longitudinal edges 118 which are used to adhere the caps 110,112 and the webs 114,116 to each other. Accordingly, the two longitudinal edges 118 of the windward cap 112 are fastened to the lower longitudinal edges 118 of the leading web 114 and the trailing web 116. Similarly, the two longitudinal edges 118 of the leeward cap 110 are fastened to the upper longitudinal edges 118 of the leading web 114 and the trailing web 116. The longitudinal edges 118 may define tapered end surfaces 120 as may be seen in FIG. 5 for aligning the webs 110,112 and the webs 114,116 relative to each other before and during the adhering procedure. The spar further comprises a trailing additional web 122 which is integral with the spar 106 which is discussed further below. The trailing additional web 122 is spaced from the trailing web 116 by means of spacing elements 124 which are used to space an intermediate portion 126 of the trailing additional web 122 from the trailing web 116. Moreover, the trailing additional web 122 comprises a hub end 128 and a tip end 130 between which the intermediate portion 126 is provided, see FIGS. 12 and 15. In the embodiments of the figures, both the hub end 128 and the tip end 130 are integral with the spar 106. Accordingly, the longitudinal edges 118 of both the hub end 128 and the tip end 130 are adhered to the longitudinal edges 118 of the caps 110,112, whereby the cavity 109 is defined partly by the trailing additional web 122 in the area of the hub end 128 and the tip end 130.

FIGS. 16 and 17 discloses another embodiment of the present invention, in which a mounting structure is defined on the hub end of the spar. As is described below, the spar may be defined by winding sheets of reinforcing layer around a mandrel.

FIG. 16 discloses a cross-section of a spar 106 comprising a mounting structure 134 defining a tapered end 136. The mounting structure 134 extends in a direction away from the hub end 138 of the spar 106. Similarly, the trailing additional web 122 defines a tapered end 140 which causes the trailing additional web 122 to be narrower in the direction of the hub end 138. Both the tapered ends define adhering surfaces 142, which are used to adhere the tapered ends 136, 140 together. As the two tapered ends 136, 140 are tapered in opposite directions, the thickness of the trailing additional web 122 only changes gradually in the area of overlap. Accordingly, sudden changes in the stress in the trailing additional web 122 are avoided or minimised.

Figure 9:
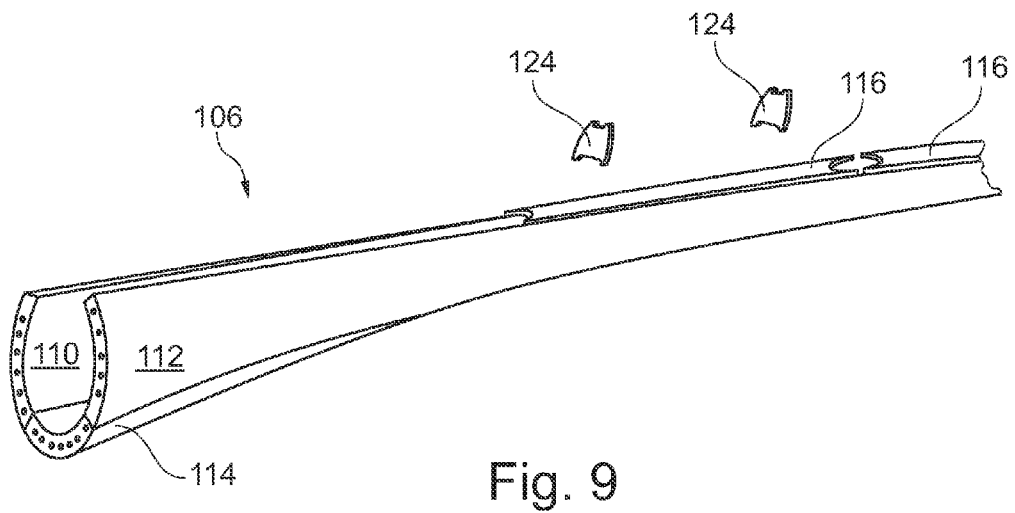
FIG. 9 discloses the process of assembling the spar 106. Initially, the caps 110,112 and the webs 114,116 are adhered to each other. Subsequently, the interconnecting elements 124 are positioned along the length of the trailing web 116. Thereafter, the trailing additional web 122 is moved into the position (illustrated in FIG. 13) in which the longitudinal edges 118 of the trailing additional web 122 are brought into connection with the trailing longitudinal edges 118 of the caps 110,112. At the same time the trailing additional web 122 is brought into contact with the interconnecting elements 124 which causes the trailing additional web 122 and the trailing web 116 to be spaced apart as illustrated in FIGS. 12, 14 and 15. It will be appreciated from FIGS. 12 and 15, that the trailing web 116 may in some embodiments be longitudinally spaced apart from the trailing additional web 122, whereby a passage 132 may be defined between the trailing web 116 and the trailing additional web 122.
Figures 10, 11:
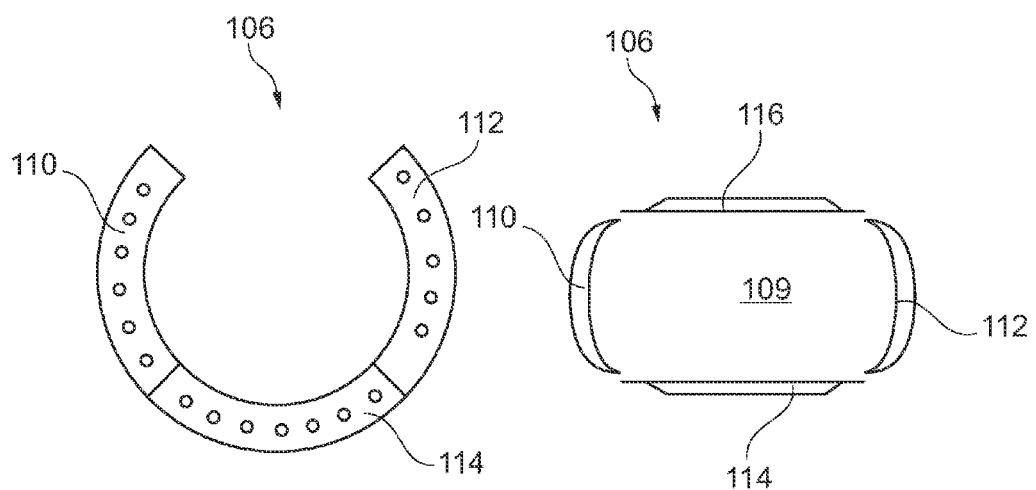

From FIG. 16, it will be appreciated that the plane defined by the adhering surfaces 142 is close to being parallel with the general direction of the additional web 122. This causes the ratio of shear stress compared to tensile/normal stress to be high in the area of adhesion. In other words, a significant amount of the force transferred via of the adhering surfaces 142 is transferred as shear forces rather than normal/tensile forces.

In order to manufacture, the tapered end 136, a foam 144 (a shape defining element) may be provided on the outer surface of the spar 106 during manufacture. This is illustrated in FIG. 17.

Initially a sheet of a reinforcing layer is wound around a mandrel (not shown). When the desired radial dimension of the spar is achieved, a shape defining element e.g. in the form of a foam 144 is positioned on the spar and the process of winding the layer of reinforcing layer is continued. Due to the provision of the foam 144, the continued winding of the reinforcing layer causes the tapered part to be build up in the area of the foam 144. The tapered part may be seen in FIG. 16. One advantage of using a foam is that it is light and inexpensive and may thus form part of the final product. In other embodiments, the shape-defining element is reused and may e.g. be made of metal.

The invention claimed is:

1. A rotor blade for a wind turbine, the rotor blade comprising a shell and a spar, the shell forming a windward and a leeward side and the spar forming a longitudinally extending structure within the shell, the spar comprising:
   two caps;
   a leading web;
   a trailing web; and
   one or more additional webs;
   wherein each web extends between the windward and leeward sides of the shell;
   wherein the leading web and trailing webs are interconnected by the caps to form a hollow structure;
   wherein each additional web has a hub end and a tip end and defines an intermediate portion between the hub end and the tip end where at least one of the tip and the hub ends is directly connected to the caps or the leading or the trailing web; and wherein in a direction transverse to the longitudinal direction of the spar when at a cross section of the spar along the intermediate portion, the intermediate portion of each additional web is spaced apart from the leading and trailing webs.

2. The rotor blade according to claim 1, wherein the shell forms a leading edge and a trailing edge and wherein the rotor blade defines a trailing additional web arranged between the trailing edge and the trailing web.

3. The rotor blade according to claim 2, wherein the trailing additional web forms at least a part of the shell in the area of the trailing edge.

4. The rotor blade according to claim 1, wherein the shell forms a leading edge and a trailing edge and wherein the rotor blade defines a leading additional web arranged between the leading edge and the leading web.

5. The rotor blade according to claim 4, wherein the leading additional web forms at least a part of the shell in the area of the leading edge.

6. The rotor blade according to claim 1, further comprising one or more interconnecting elements arranged to abut one of the additional webs and one of the leading and trailing webs so as to space apart the intermediate portion of said additional web from the leading and trailing webs.

7. The rotor blade according to claim 1, wherein one of the caps is a leeward cap, the other of the caps is a windward cap, the leeward and windward caps have longitudinal edges, and the leeward and windward caps are interconnected at their longitudinal edges by means of the leading and the trailing webs so as to define the longitudinally extending hollow structure.

8. The rotor blade according to claim 7, wherein at least one of the leeward cap and the windward cap defines a part of an aerodynamic profile of the rotor blade.

9. The rotor blade according to claim 1, wherein the longitudinally extending hollow structure defines a mounting structure with an adhering surface to which one or more additional webs is adhered so as to allow tensile forces to be transferred from the one or more additional webs to the mounting structure.

10. The rotor blade according to claim 9, wherein the mounting structure and the one or more additional webs are shaped such that the tensile forces are gradually transferred from the one or more additional webs to the mounting structure when seen from each of the intermediate portions of the one or more additional webs and towards the hub ends thereof.

11. The rotor blade according to claim 9, wherein the mounting structure defines a tapered protrusion extending from an outer surface of the spar, and wherein each of the one or more additional webs has a tapered end, which is adhered to the tapered protrusion such that a joint cross-sectional area of each of the one or more additional webs and the mounting structure is constant or changes gradually in the area of overlap when seen from the intermediate portion of the additional web and towards its hub end thereof.

12. The rotor blade according to claim 9, wherein the mounting structure defines a tapered protrusion extending from an outer surface of the spar, and wherein each of the one or more additional webs has a tapered end.

13. A wind turbine comprising a plurality of rotor blades according to claim 1.

14. A rotor blade for a wind turbine, the rotor blade comprising a shell and a spar, the shell forming a windward side, a leeward side, a leading edge, and a trailing edge and the spar forming a longitudinally extending structure within the shell, the spar comprising:
    a leading web, a trailing web, a first cap, and a second cap, the leading and trailing webs being interconnected by the first and the second caps to form a hollow structure; and
    at least one additional web,
    wherein each of the at least one additional web has a hub end and a tip end and defines an intermediate portion between the hub and tip ends, where at least one of the hub and tip ends is directly connected to the caps or the leading or the trailing web, and
    wherein the intermediate portion of each of the at least one additional web is spaced apart from the leading and trailing webs and the leading and trailing edges.

* * * * *